ical Schiff-base, which serves as a reaction medium and moderator. The reaction mixture is heated slowly to 250 to 300° C. to produce a fusible, black polymer. Heating to higher temperatures removes the monofunctional Schiff base and converts the polymer to an infusible material having a very high degree of thermal stability.

United States Patent Office 3,516,971
Patented June 23, 1970

3,516,971
AROMATIC DIAMINE-AROMATIC DIALDEHYDE HIGH - MOLECULAR - WEIGHT SCHIFF - BASE POLYMERS PREPARED IN A MONOFUNCTIONAL SCHIFF-BASE
James E. Webb, Administrator of the National Aeronautics and Space Administration, with respect to an invention of Gaetano F. D'Alelio, Notre Dame, Ind.
No Drawing. Filed Nov. 9, 1966, Ser. No. 593,595
Int. Cl. C08g 9/06
U.S. Cl. 260—72.5                 7 Claims

ABSTRACT OF THE DISCLOSURE

Schiff-base polymers having the repeating unit represented by the formula

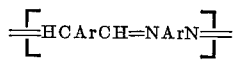

where Ar is an arylene moiety are prepared in tractable, fusible, high-molecular-weight form amenable to fabrication into useful articles by reacting an aromatic diamine having the formula $H_2NArNH_2$ with an aromatic dialdehyde having the formula $OHCArCHO$ in a monofunctional Schiff-base, which serves as a reaction medium and moderator. The reaction mixture is heated slowly to 250 to 300° C. to produce a fusible, black polymer. Heating to higher temperatures removes the monofunctional Schiff base and converts the polymer to an infusible material having a very high degree of thermal stability.

---

The invention described herein was made in the performance of work under a NASA grant and is subject to the provisions of Section 305 of the National Aeronautics and Space Act of 1958, Public Law 85–568 (72 Stat. 435; 42 U.S.C. 2457).

This invention relates to Schiff base polymers and to a process for preparing the same.

Polymeric Schiff bases having the general formula

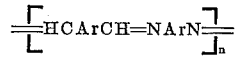

where Ar represents an arylene moiety offer outstanding heat-resistant properties. Polymers having this structure can withstand temperatures in excess of 400° C. for sustained periods without undergoing significant degradation or phase changes. This high degree of thermal stability is believed to result from the conjugated structure of the polymer, the double bond —C=N— linkage characteristic of Schiff bases being alternated with arylene groups. Schiff-base polymers offer an attractive material for applications in the aerospace field as well as for other uses requiring high-temperature stability.

Schiff-base polymers have been prepared previously by a condensation reaction of an aromatic dialdehyde with an aromatic diamine in a solution system, for example, by reaction of terephthaldehyde with p-phenylenediamine in benzene or alcohol. The product of this reaction has been a yellow-to-orange "brick dust" powder having a relatively low molecular weight. The "brick dust" polymer is an intractable material, infusible and insoluble in most solvents and therefore not amenable to fabrication into useful products. Black polymers should be expected from these reactants if the molecular weight is sufficiently high that conjugation is extensive. It is desired to prepare Schiff-base polymers in the form of tractable, black, high-molecular-weight material suitable for further processing into useful products.

Black Schiff-base polymers having a high molecular weight have now been prepared by reacting the aromatic diamine and aromatic dialdehyde in a melt system, a mixture of these reagents being heated to a temperature above the melting point in the absence of any solvent. Polymerization to a high molecular weight proceeds very rapidly under these conditions, but the reaction is difficult to control, and this process does not permit isolation readily or easily of a tractable, fusible polymer at an intermediate stage.

It is therefore an object of this invention to provide an improved process for synthesizing Schiff-base polymers.

Another object is to provide tractable, fusible Schiff-base polymers suitable for fabrication into useful products.

Another object is to provide a method of moderating and controlling the melt reaction of aromatic diamines and aromatic dialdehydes.

Other objects and advantages of the invention will be apparent from the following description.

In the present invention Schiff-base polymers having the formula

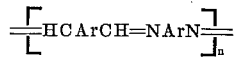

where Ar is an arylene moiety are prepared by reacting an aromatic diamine and an aromatic dialdehyde in the presence of a monofunctional Schiff base. The monofunctional Schiff base serves as a solvent and moderator for the reaction so that polymerization can be interrupted before the polymer becomes intractable. In addition, the monofunctional Schiff base enters into the polymerization reaction to a limited extent, as evidenced by yields in excess of 100%.

The aromatic diamine reactant is represented by the formula

where Ar is an arylene moiety. The arylene moiety can be a single phenylene ring structure such as m-phenylene, p-phenylene, or a phenylene ring having one or two hydrogen atoms substituted by methyl groups; a diphenylene group; or a group consisting of two phenylene groups linked by one or more hetero atoms or groups such as $O$, $S$, $SO_2$, $C=O$, $NH$, $N—CH_3$, $C_2H_2$, or $CH_2$ and $SO_2$. Aliphatic chain linkages containing more than one methylene group are excluded from the groups between phenylene rings since the conjugated structure of the polymer backbone, which is critical to thermal stability, would not be attained. In latter groups the lnkages attached to the phenylene groups can be in the meta-meta, meta-para, or para-para positions. Illustrative examples of specific amine reactants are p-phenylenediamine, m-phenylenediamine, and the p,p'; m,m'; and m,p' forms of bianiline, diaminodiphenyl sulfone, diaminodiphenyl amine, diaminodiphenyl sulfide, diaminodiphenyl ethylene, diaminodiphenyl acetylene, etc.

The aromatic aldehyde reactant is represented by the formula

where Ar is an arylene moiety. Ar can be any of the groups given above for Ar in the amine reactant. Examples of specific aldehyde reactants are m-phthaldehyde, terephthaldehyde and the p,p'; p,m'; and m,m' forms of diformyldiphenyl methane, diformyldiphenyl oxide, diformyldiphenyl sulfide, diformyldiphenyl sulfone, diformyldiphenyl ketone, diformyldiphenyl amine, diformyldiphenyl ethylene, diformyldiphenyl acetylene, etc.

The monofunctional Schiff base used in the present process is represented by the formula

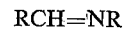

where R is an aromatic moiety. Examples of aromatic moieties included are $C_6H_5$, $CH_3C_6H_4$, $(CH_3)_2C_6H_3$, $(CH_3)_3C_6H_2$, $C_6H_5C_6H_4$, $C_6H_5OC_6H_4$, $C_6H_5SC_6H_4$, and $CH_3OC_6H_4$. Benzylideneaniline, $C_6H_5CH=NC_6H_5$, is preferred. The monofunctional Schiff base is preferably provided in the reaction mixture at a weight proportion at least equivalent to the weight of the product, but the proportion is not critical. Excessively large amounts of monofunctional Schiff base may result in premature termination or even reversal of the reaction before the desired stage is reached, in which case a portion of the excess should be removed by distillation.

Polymerization is initiated by heating a mixture of the reactants and the monofunctional Schiff base to a temperature above the melting point of the mixture at about 130° C. Formation of a high-molecular-weight polymer begins to occur at about 140° C. The mixture is heated slowly, as for example, at a temperature increase rate of 5° to 25° C. per minute up to at least 250° C. Polymerization proceeds through increasing stages of molecular weight during this step, as evidenced by vivid changes in color. The mixture forms a clear solution upon melting, and the solution undergoes a series of color changes from clear to bright yellow to orange to brown and finally to black. In order to ensure complete conversion to the desired fusible, black material, the mixture is held at 250° to 300° C. for and extended period, preferably one to five hours. An equilibrium stage is reached at this temperature and no further polymerization will occur until the monofunctional Schiff base is removed from the mixture.

The product polymer is then recovered by removing the monofunctional Schiff base by distillation at a temperature of 300° to 350° C. The product, in the form of a glassy, black coherent mass, can be polymerized further in the solid state by heating to a temperature not exceeding about 375° C. if tractable intermediate polymers are desired. In such cases, higher temperatures are to be avoided since the polymer would become infusible and intractable. The black fusible polymer is then ground into small fragments or powder for further processing to be described below.

In order to avoid or reduce oxidation and side reactants the polymerization reaction and subsequent heating steps are carried out in substantial absence of moisture and oxygen. An atmosphere of an inert gas such as nitrogen or helium is preferably employed for this purpose. Although not critical, removal of the monofunctional Schiff base is enhanced by use of reduced pressure in this step of the process. To facilitate these measures the reaction is carried out in apparatus provided with distilling equipment and inert gas and vacuum lines.

Fusible, black Schiff base polymers can also be prepared by heating a low-molecular-weight yellow-to-orange polymer in a molten monofunctional Schiff base. In this embodiment the diamine and dialdehyde defined above are first reacted in an organic solvent to produce the low-molecular-weight polymer. Thus reaction can be carried out in any inert solvent which dissolves the reactants, and benzene, toluene, alcohol, dioxane, tetrahydrofuran, dimethylformamide, dimethylacetamide and the like can be used. The polymer forms an insoluble precipitate in this method before attaining a high molecular weight, and no further reaction is obtained even after reflusing for a period of 24 hours. The precipitated polymer is readily recovered by filtration.

The low-molecular-weight polymer is then heated in an excess of a monofunctional Schiff base having the formula given above. The polymer dissolves in the molten Schiff base to produce a solution similar to that obtained where the polymerization reaction is conducted in this medium. The resulting solution is then heated to 250° to 300° C. to effect further polymerization. The conditions given above for polymerization in the monofunctional Schiff base can also be used in this embodiment.

The product polymer obtained by either of the reactions described above can be obtained in the intermediate stages as a brittle, black, fusible material, if the temperature at which it becomes infusible and intractable, about 375° to 400° C. has been avoided in its preparation. This material has a relatively high molecular weight, estimated to be in excess of 20,000 although the insolubility of the polymer has prevented an exact determination. Upon further heating it undergoes additional polymerization in the solid state and forms an infusible, tough solid with excellent thermal stability and good mechanical properties. Fabrication of the polymer into the desired shape or structure must be performed while it is in the fusible stage because of the intractable nature of the infusible material.

In one preferred fabrication procedure the fusible polymer in finely divided form is mixed with a small amount of a Lewis acid catalyst, compressed into the desired shape in a suitable mold and heated to a temperature of 400° to 600° C. Holding at this temperature for a period of at least 5 to 20 minutes is preferred to ensure completion of conversion to the desired form, although massive structures may require longer periods of time. Any remaining amounts of monofunctional Schiff base or unreacted monomers are evolved during this treatment; these can be removed by postheating the molded form in an inert atmosphere at 700° to 1,000° C. for one to four hours or more. An atmosphere of an inert gas such as nitrogen or a vacuum is provided in this step to avoid oxidative degradation. A small amount, for example, 0.5 to 1 weight percent, of a Lewis acid is provided in the moldable mixture to catalyze the solid-state polymerization reaction. Examples of Lewis acids which can be used include zinc chloride, ammonium chloride, boron trifluoride, titanium tetrachloride, zirconium tetrachloride, mercuric bromide, cobalt iodide, nickel sulfate, cadmium nitrate, cadmium perchlorate, silicon terachloride, arsenic tribromide, antimony pentabromide, bismuth trichloride, tin tetrachloride, trimethylamine, hydrochloride, trimethylamine hydrobromide, phosphoric acid, tributylphosphonium chloride, p-toluenesulfonic acid, and the like.

For the fabrication of composite heat shields, for which Schiff base polymers are a particularly attractive material, the fusible polymer-Lewis acid mixture can be intermingled with the other components of the composite, for example reinforcing fibers of a refractory material such as silica or fiberglass, prior to the heat treatment described above.

This invention is illustrated by the following examples. The parts and percentages given are by weight unless otherwise indicated.

EXAMPLE I

A mixture of 1.08 parts p-phenylenediamine and 1.34 parts terephthaldehyde is heated in a microflask under a slow stream of nitrogen. The mixture is heated to the melting point (130° C.) and the resulting fluid melt is heated to 150° to 160° C. for two minutes. The melt rapidly becomes more viscous, changing in color from light yellow to orange to brown to black. The mixture is then heated for one hour at 180° C. and one hour at 260° C. and allowed to cool. A black polymer is obtained at a yield of 97%.

EXAMPLE II

A mixture of 1.08 parts p-phenylenediamine, 1.34 parts terephthaldehyde and 1.0 part benzylideneaniline is reacted by the procedure of Example I, except that the mixture is subjected to a final heating for four hours at 325° C. The viscosity of the melt is much lower than in Example I and does not increase noticeably until the benzylideneaniline is removed during heating at 325° C. The reaction mixture remains homogeneous, and further polymerization proceeds through a fusible stage in a controllable manner. The mixture is then allowed to cool, and a shiny black polymer is recovered at a yield of 2.16 parts.

EXAMPLE III

A mixture of 1.0 part p-phenylenediamine and 10 parts benzylideneaniline is melted together under a nitrogen atmosphere in the apparatus of Example I, and 1.34 parts terephthaldehyde is then added to the mixture. The resulting mixture is then heated according to the following schedule: 2 hours at 120° to 220° C., 5 hours at 200° C., 10 hours at 260° C., 10 hours at 290° C., all at atmospheric pressure, and 10 hours at 290° C. and 140 mm. Hg pressure. The system is allowed to cool, and a dark brownish-black polymer is recovered at a yield of 107.8%.

EXAMPLE IV

A mixture of 1.44 parts of p-phenylenediamine, 1.34 parts terephthaldehyde and 350 milliliters of benzene is refluxed in a round-bottomed flask attached to a Dean-Stark trap. The mixture turns bright yellow and is completely reacted in one hour. No further change in appearance occurs after 20 hours refluxing. The bright yellow polymer is then recovered at a yield of 103.4%.

A mixture of 1 part of the yellow polymer and 4.0 parts benzylideneaniline is heated in the apparatus of Example I according to the following schedule: 4.5 hours at 140° C., 0.5 hour at 310° C., both at atmospheric pressure, 12 hours at 280° C. and 140 mm. Hg and 24 hours at 280° C. and 7 mm. Hg. The system is then allowed to cool, and a shiny black solid polymer is recovered. Formation of the black polymer is first observed in heating at 140° C.

In the process of this invention, the aldehyde and amine components of the Schiff base, RCH=NR, react with the arylene dialdehyde and the diamine becoming the terminal ends of the polymer chain so that solubilization of the growing chain is maintained and the final structure of the polymer is

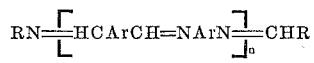

Solution polymerization of arylene dialdehydes and diamines yields "brick dust" polymers in which the average value of $n$ is about 2. In contrast, the fusible black polymers prepared by the process of the present invention have a value of $n$ that is at least 5. At higher degrees of concentration the value of $n$ exceeds 20, and after postheating, it reaches 100 to 1000 or more. In addition, due to the presence of aromatic end groups in these polymers, their thermal stabilities in both nitrogen and air are orders of magnitude higher than for polymers prepared by the previously known solution condensation method. This greatly improved thermal stability was unpredictable and entirely unexpected.

The thermal stabilities of the polymers prepared by the process of this invention are substantially identical to those prepared by the bis Schiff-base exchange method disclosed in applicant's copending application Ser. No. 593,594, filed Nov. 9, 1966 and assigned to the same assignee as the present invention and to which reference is hereby made.

What is claimed is:

1. A process for preparation of a polymer consisting essentially of the formula

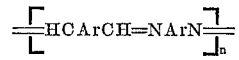

where Ar is an arylene moiety selected from the class consisting of a phenylene group, a diphenylene group and a group consisting of two phenylene groups linked by a component of the class consisting of O, S, $SO_2$, C=O, NH, $N-CH_3$, $CH_2$ and $SO_2$, and $C_2H_2$ and $n$ has a value of at least 5 which comprises heating a mixture of an aldehyde having the formula OHCArCHO where Ar is said arylene moiety and an amine having the formula $H_2NArNH_2$ where Ar is said arylene moiety in a monofunctional Schiff base having the formula RCH=NR where R is an aryl moiety selected from the class consisting of $C_6H_5$, $CH_3C_6H_4$, $(CH_3)_2C_6H_3$, $(CH_3)_3C_6H_2$, $C_6H_5C_6H_4$, $C_6H_5OC_6H_4$, $C_6H_5SC_6H_4$ and $CH_3OC_6H_4$ to a temperature of 140° C. to 375° C. under an inert atmosphere until a fusible black polymer is formed and recovering said polymer.

2. The process of claim 1 wherein said monofunctional Schiff base is

3. The process of claim 1 wherein said mixture is held at a temperature of 250° C. to 300° C. under an inert gas atmosphere for a period of at least one hour, the monofunctional Schiff base is removed therefrom by distillation at a temperature of 300 to 350° C. and the resulting fusible polymer is converted to infusible form by heating in the presence of a Lewis acid catalyst to a temperature of 400° C. to 1000° C. under an inert gas atmosphere.

4. The process of converting an intractable, low-molecular-weight polymer consisting essentially of the formula

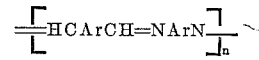

where $n$ is less than 5 and Ar is an arylene moiety selected from the class consisting of a phenylene group, a diphenylene group and a group consisting of two phenylene groups linked by a component of the class consisting of O, S, $SO_2$, C=O, NH, $N-CH_3$, $CH_2$ and $SO_2$ and $C_2H_2$ to fusible, black form which comprises heating said polymer in a monofunctional Schiff base having the formula RCH=NR where R is an aryl moiety selected from the class consisting of $C_6H_5$, $CH_3C_6H_4$, $(CH_3)_2C_6H_3$, $(CH_3)_3C_6H_2$, $C_6H_5C_6H_4$, $C_6H_5OC_6H_4$, $C_6H_5SC_6H_4$ and $CH_3OC_6H_4$ to a temperature of 140° C. to 375° C. under an inert gas atmosphere until a fusible black polymer is formed and recovering the resulting polymer.

5. The process of claim 1 wherein said mixture is heated at a temperature of 250° C. to 300° C. for a period of at least one hour.

6. The process of claim 5 wherein said mixture is heated at a temperature increase rate of 5° C. to 25° C. per minute.

7. The process of claim 4 wherein said polymer is heated at a temperature of 250° C. to 300° C. for a period of at least one hour.

References Cited

UNITED STATES PATENTS 3,198,767   8/1965   Matsuda et al. _____ 260—65

OTHER REFERENCES

"Jour. Polymer Science," Part C, No. 4 (1963), pp. 1305–1313, Topchiev et al. "Jour. Polymer Science, B2 (1964), pp. 943–946, Stivala et al., "Makeomolekulare Chemie," vol. 84 (1965), pp. 238–249, Danhauäser et al. (pp. 238–240 only needed).

"Jour American Chem. Soc.," vol. 88 (May 1966), pp. 1943–1947, Manassen et al., "Makeomolekulare Chemi," vol. 56 (1962), pp. 195–199, Akitt et al.

WILLIAM M. SHORT, Primary Examiner

E. WOODBERRY, Assistant Examiner

U.S. Cl. X.R.

260—39